United States Patent [19]

Fardin

[11] 4,435,114
[45] Mar. 6, 1984

[54] CONTAINER LID SEPARATING ASSEMBLY

[75] Inventor: Carlos Fardin, Paterson, N.J.

[73] Assignee: Van Dam Machine Corporation of America, West Paterson, N.J.

[21] Appl. No.: 301,064

[22] Filed: Sep. 11, 1981

[51] Int. Cl.³ .................................... B65G 59/00
[52] U.S. Cl. .................................... 414/330; 198/408; 198/443; 198/461; 198/735; 271/34; 221/253
[58] Field of Search ............... 198/408, 443, 457, 461, 198/592, 607, 735, 836; 414/112, 124, 130, 330, 104, 123, 129; 221/218, 253; 271/34, 35, 271

[56] References Cited

U.S. PATENT DOCUMENTS

| | | | |
|---|---|---|---|
| 1,876,252 | 9/1932 | Lehman | 198/592 |
| 2,198,036 | 4/1940 | Isted | 198/443 |
| 2,424,103 | 7/1947 | Lobley et al. | 221/253 |
| 2,628,701 | 2/1953 | Schrage | 414/129 |
| 2,792,922 | 5/1957 | Malhiot | 414/129 |
| 3,197,013 | 7/1965 | van der Winden | 198/408 |

FOREIGN PATENT DOCUMENTS 73792 9/1946 Norway .................................. 414/130

Primary Examiner—Joseph E. Valenza
Assistant Examiner—Jonathan D. Holmes
Attorney, Agent, or Firm—David A. Jackson; Daniel H. Bobis

[57] ABSTRACT

An apparatus for handling objects such as container lids utilizes a separator assembly comprising a downwardly extending chute having an essentially L-shaped cross-section, for the rotation of the lids from a vertical disposition, to a horizontal disposition upon their ejection on to a horizontal conveyor or the like. An endless, movable platform is adjacent the chute and is adapted for downward movement in a line of travel that is essentially parallel and inboard of the chute. A plurality of cleats are mounted on the movable platform, and sweep through the channel within the chute, to urge the container lids to enter and make full traverse without jamming of the assembly, or damage to the lids. The present assembly is capable of high speed operation with minimal jamming and container lid damage.

12 Claims, 8 Drawing Figures

CONTAINER LID SEPARATING ASSEMBLY

BACKGROUND OF THE INVENTION

1. Field of the Invention

The present invention relates to apparatus for stacking and conveying container lids, and more particularly to a conveying assembly for the transfer of the lids from an upright vertical position, to a horizontal position on a moving conveyor belt.

2. Description of the Prior Art

A variety of automated machinery has been developed and is in use for the purpose of continuous conveyance of small manufactured articles, during their manufacture and preparatory to their shipment. In particular, continuous conveying and stacking apparatus is utilized in the manufacture and shipping of parts for various containers, and particularly the circular lids for plastic and metal containers, such as coffee cups, soft drink cans and the like.

Conveying apparatus is useful to transport container lids from the point of initial formation, to further work stations where printing, or embossing of the lids may take place, after which the lids are stacked or nested, and may be packaged for shipment. One particular type of container lid conveying apparatus utilizes the principle of gyroscopic precession, as outlined in U.S. Pat. No. 3,463,293, to Lederer, to stack the lids on their rims, and to maintain the lids closely adjacent and axially aligned with each other in motion, to facilitate transport and packaging.

Generally, while the lids may be maintained in the vertical plane as above described, certain intermediate processes are desired, that require that the lids be located in the horizontal position. Thus, conveying apparatus generally employ intermediate conveying means to transport the vertically stacked and spinning lids from the rotating infeed rods on which they are gyroscopically balanced, to a generally horizontal conveyor, where they are disposed in spaced apart relation. The problems associated with the present invention relate primarily to the instance where the container lids are fed into the apparatus and must be transported from the vertical to the horizontal position as above set forth.

To accomplish the transport of the lids in such manner, a variety of intermediate conveying assemblies have been proposed and are in use. Of those presently in use, one particular assembly utilizes a constantly oscillating knife edge that pries the forwardmost lid apart from the stack of vertically rotating lids disposed on the infeed rolls, and shunts it into a vertical track from which it is propelled into the horizontal position and onto a moving conveyor belt or the like.

The assembly described above has certain drawbacks, particularly in the instance where the conveyor is to be run at the high speeds desirable for commercial manufacturing conditions. For example, in the instance where the container lids are of the self locking type, these lids, by design, tend to nest with each other while positioned on the spinning rods, with the result that the oscillating knife is unable to cleanly separate the frontmost lid from the stack, and the frontmost lid is thus either propelled out of the assembly entirely, or is misfed and causes a jamming of the assembly. Also, the oscillating knife tends to stray from its path of vibration at high speed, with the result that it runs askew and thus fails to travel between the forwardmost container lid and the container lid next adjacent to it.

A need therefore exists for an orienting conveyor assembly that can operate smoothly and accurately at high speed.

SUMMARY OF THE INVENTION

In accordance with the present invention, a separator assembly is provided for the continuous translational movement of manufactured items such as container lids, and comprises an assembly housing pivotally mounted on a base, having parallel vertical walls connected by a transversely extending cross member. The vertical walls lie in planes parallel to the direction of travel of the container lids.

At least one downwardly extending chute is mounted between the walls of the assembly housing. The chute has a generally vertical infeed end, a generally horizontal discharge end, and a plane rotating, arcuately-directed channel located in between. The chute is generally L-shaped in cross section, and comprises at least one broad, partially curvilinear outer wall, at least one broad, partially curvilinear wall spaced apart and parallel thereto, and preferably includes laterally disposed, parallel side walls extending therebetween. The arcuately-directed channel is sufficiently gradual in its curvature to permit the unobstructed passage of the container lids in operation.

The separator assembly includes a movable lid advancing means that has a line of travel parallel and inboard of the chute, and cooperates with the chute to urge container lids into the infeed end and follows them entirely therethrough. The lid advancing means comprises an endless flexible platform that is rotatable about horizontal axes, and bears on its surface a plurality of regularly spaced outwardly protruding cleats adapted to make edge contact with the container lids, and to maintain such edge contact while passing through the arcuately-directed channel, to urge the container lids along and out of the discharge end of the chute.

The lid advancing means also includes a guide means providing at least one track to support the platform during its downward travel adjacent the inner wall of the chute. In one embodiment, the platform may comprise a strip-like belt or the like defining parallel lateral edges, and the guide means may correspondingly comprise one or more rails defining parallel tracks adapted to receive the respective edges of the platform, to minimize any oscillatory movement of the platform while it passes adjacent the chute.

A further feature of the present separator assembly is its ability to pivot as a unit about a horizontal axis, to adjust for variations in container lid construction. The assembly housing is disposed about a horizontal pivot axis that, in turn, is supported by parallel vertical arms extending upward from the base of the separator assembly. The entire housing is capable of tilting forward, in the direction of lid travel, in the instance, for example, where the container lids being transported are of the interlocking variety. An incremental adjustment means extends between the adjacent surfaces of the supporting arm and the housing wall, and may comprise a screw adjustment or the like.

Construction of the present separator assembly substantially reduces unwanted apparatus vibration during operation, that minimizes jamming and breakdown. The pivoting capability of the assembly housing adds increased versatility, as the separator assembly may be easily adjusted for use with a variety of container lid designs.

Finally, the present separator assembly utilizes a minimum number of moving parts and is of simple design, so that manufacture and maintenance of the unit in use are favorably minimized.

Accordingly, it is a principal object of the present invention to provide an apparatus for transporting vertically stacked work pieces such as container lids to spaced apart, horizontal disposition on a moving conveyor means.

It is a further object of the present invention to provide an apparatus as aforesaid, that is of simplified construction and operation.

It is a further object of the present invention to provide an apparatus as aforesaid, that is capable of accurate high speed operation and minimal down time.

It is a yet further object of the present invention to provide an apparatus as aforesaid, that is independently adjustable to accommodate variations in container lid design.

Other objects and advantages will become apparent to those skilled in the art from a consideration of the ensuing description which proceeds with reference to the following illustrative drawings.

DETAILED DESCRIPTION

Figure 1:
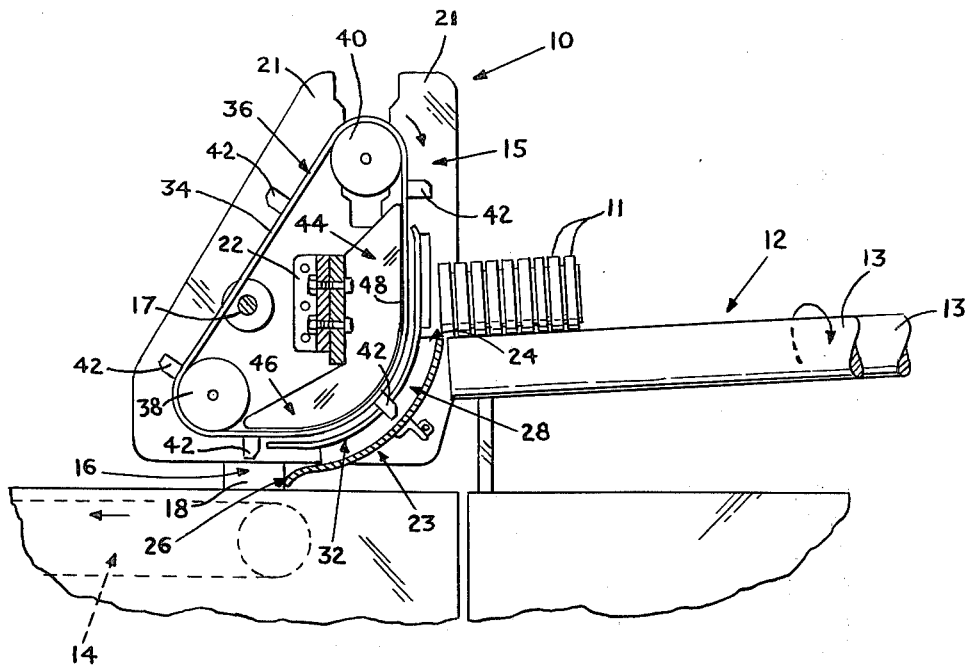
FIG. 1 is a side sectional view partly in phantom illustrating the separator assembly of the present invention installed in a lid conveying machine.

Referring to FIG. 1, separator assembly 10 is shown in section, as part of a combined apparatus for the transport of container lids 11. Assembly 10 is thus shown in conjunction with a preliminary vertical stacking assembly 12 comprising infeed spinning rods 13 shown fragmentarily, that, by principles illustrated in U.S. Pat. No. 3,463,293 to Lederer, incorporated herein by reference, maintain the container lids 11 in an upright vertical stacked arrangement.

The overall apparatus, not shown herein, may be used, for example, to imprint on the uppermost surface of the lids 11, certain desired indicia. Accordingly, the vertically stacked lids 11 must be disposed horizontally flat and spaced apart from each other for such purpose, and particularly, must be conveyed from spinning rods 13 to horizontal conveyor 14, shown herein in phantom.

As noted earlier, the distribution and separation of container lids 11 in such manner has been attended by a variety of problems in the prior art. Such problems as machinery jamming and breakdown at the high speeds at which such operations commercially take place, have been experienced. It is to this end, that separator assembly 10 has been developed and operates as will be disclosed hereinafter.

Referring again to FIG. 1, separator assembly 10 comprises an assembly housing 15 shown partially herein. Housing 15 is pivotally mounted on a base 16 about a pivot axis 17 better illustrated in FIG. 4. In particular, base 16 extends upward in the form of arms 18 that terminate at their upper end in a cradle 19 for the reception of pivot axis 17, comprising pivot rod 20.

One of the features of the separator assembly of the present invention is that it can adjust its attitude with respect to the vertical, to accommodate variations in the size and design of container lids 11. In particular, assembly housing 15 can pivot about pivot axis 17, in a direction either toward or away from conveyor 14. For example, separator assembly 10 may be pivoted forward toward conveyor 14, in the instance where container lids 11 having self locking capability are being fed through the apparatus.

Figure 3:
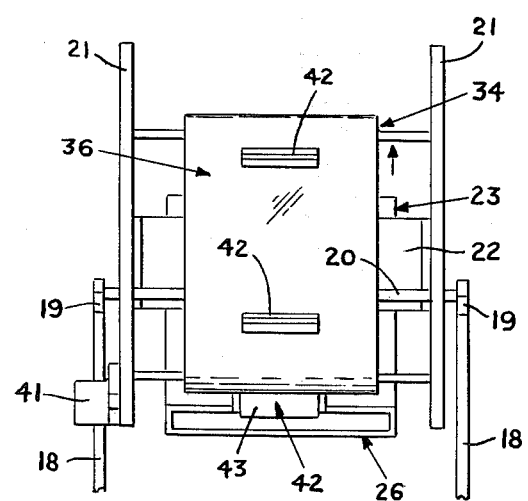
FIG. 3 is a partly broken front view of the separator assembly of FIG. 1.

Referring further to FIG. 1, assembly housing 15 comprises parallel vertical walls 21, both shown in FIG. 3, that are disposed with their broad surfaces in planes parallel to the direction of travel of the container lids 11. A connecting cross member 22 extends between the adjacent surfaces of walls 21, to fix them to each other, and to provide the support for certain of the operating structures of separator assembly 10.

CHUTE

Figure 2:
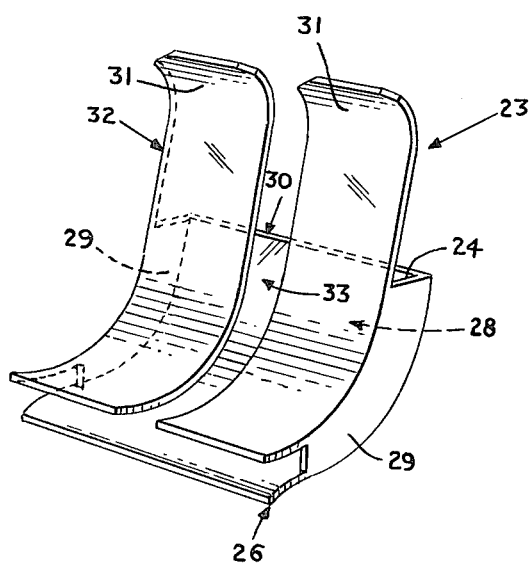
FIG. 2 is a perspective view partly in phantom illustrating the chute of the separator assembly of the present invention.

Assembly 10 further includes a downwardly extending chute 23 to receive and transport the container lids 11 as described later on. Chute 23 is mounted between walls 21, and is seen in FIG. 2 to have a generally vertically disposed infeed end 24 and a generally horizontal discharge end 26. A plane rotating, arcuately-directed channel 28 is defined therebetween. Channel 28 is of sufficient size and graduated curvature to permit individual container lids 11 to make easy traverse by simple sliding action. The curvature illustrated in the FIGURES herein is for purposes of illustration only, and should not be relied upon for dimensional accuracy, as it is understood that the arc of channel 28 would be modified to suit variations in container lid size and shape within the scope hereof, to permit ease of movement therethrough.

Referring further to FIGS. 1 and 2, chute 23 comprises a broad, partially curvilinear outer wall 30 and a broad partially curvilinear inner wall 32 disposed parallel and spaced apart from wall 30. Walls 30 and 32 cooperate to define, at their respective ends, infeed end 24 and discharge end 26. Referring to FIG. 2, wall 32 may extend above wall 30, and in one embodiment, may define at its upper end outwardly flared lips 31, to present a smooth impact surface to container lids 11, and to prevent snagging of lid edges as the lids 11 are introduced into the infeed end 24 during the operation of separator assembly 10, discussed later on herein. Side walls 29 may connect walls 30 and 32.

Walls 30 and 32 define between them channel 28 as shown. As will be described later on, wall 32 is split by slot 33 to enable the lid advancing means generally designated 34 to urge the container lids 11 into and through chute 23. In similar fashion to infeed end 24, discharge end 26 may be provided with a downward flare along the leading edge of outer wall 30, to assure the unobstructed discharge of container lids 11 from chute 23.

LID ADVANCING MEANS

The lid advancing means 34 cooperates with the chute to urge the container lids 11 into infeed end 24, and through channel 28. The lid advancing means comprises an endless, flexible platform 36 that is rotatable about one or more horizontal axes that are disposed so that a portion of the line of travel of platform 36 is in the vertically downward direction. Lid advancing means 34 is mounted between walls 21, as shown in FIG. 3, and is situated so that the downward movement of platform 36 occurs adjacent chute 23. More particularly, a portion of the line of travel of platform 36 follows the path that is inboard of chute 23 and adjacent inner wall 32, and more specifically, runs parallel to inner wall 32 but is slightly spaced apart therefrom.

Platform 36 is mounted for rotation about paired horizontal axes which preferably comprise a lower drive axis or pulley 38 and an upper idler axis or pulley 40. The term "pulley" is utilized herein to refer broadly to those structures that would make frictional, surface contact with the underside of a continuous moving member such as platform 36. Thus, the term encompasses conveyor rollers, wheels, sprockets, and similar rotating member that would serve to define the path of rotation of platform 36 within the scope of the present invention. The platform 36, itself, may comprise an endless belt, a drive chain, or other construction discussed later on herein. The invention is therefore not limited to a specific construction but rather encompasses all such variations within its spirit and scope.

Referring further to FIGS. 1 and 3, lower drive pulley 38 provides the translational motion to platform 36 and, as shown in FIG. 3, is operatively connected to appropriate drive means such as an electric motor schematically represented at 41 as mounted on the outer surface of wall 21. Naturally, a variety of drive means may be utilized and appropriately mounted, to provide the motive power to drive pulley 38, and the present invention is not limited to the embodiment however schematically disclosed herein.

Drive pulley 38 is seen in FIG. 1 to be disposed on approximately the same horizontal level as the discharge end 26 of chute 23. This facilitates the maintenance of platform 36 in spaced apart position adjacent chute 23 as shown. Likewise, idler pulley 40 is disposed adjacent and upward of infeed end 24 of chute 23, to facilitate the proper positioning of platform 36 for downwardly movement parallel and adjacent to chute 23 as described earlier.

Figure 5A:
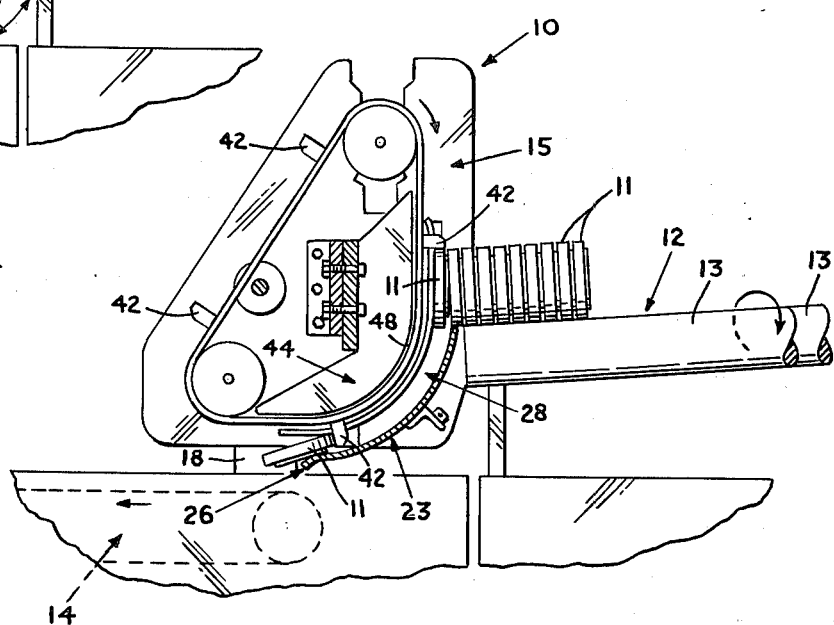
FIG. 5A is a side sectional view similar to FIG. 1 illustrating the entry of a container lid into the assembly of the present invention.
Figure 5B:
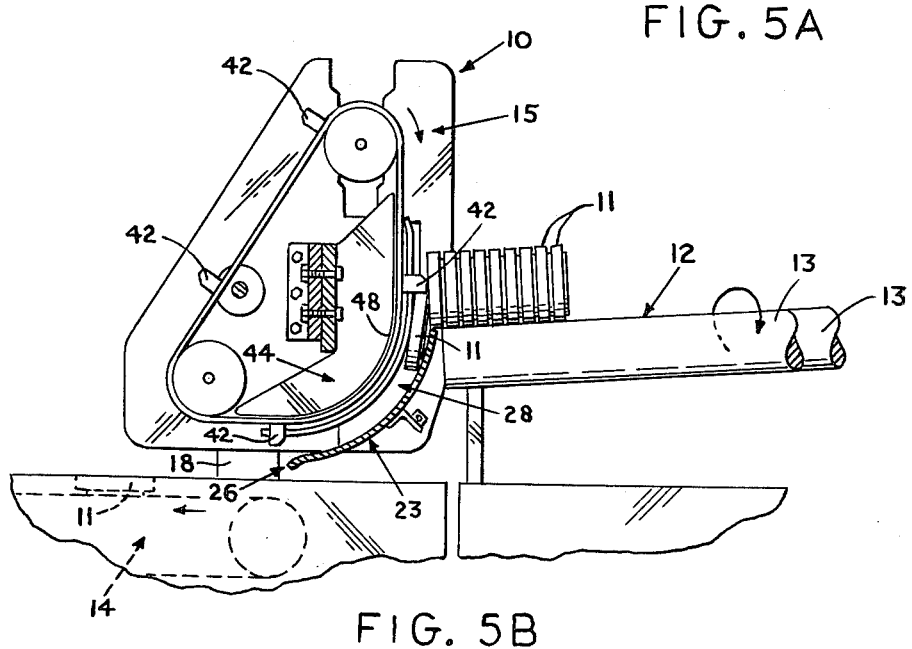
FIG. 5B is a view similar to FIG. 1 illustrating the movement of a container lid through and out of the assembly of the present invention.

Platform 36 is disposed adjacent chute 23 for the purpose of urging container lids 11 into infeed end 24, and further, to follow the container lids along the entirety of their line of travel through chute 23, until the lids 11 exit through discharge end 26. To accomplish this purpose, platform 36 is provided with a plurality of regularly spaced cleats 42 that are mounted and extend outward therefrom. Cleats 42 are provided with flat leading surfaces 43 that are adapted to make edge contact with container lids 11, as illustrated in FIGS. 5A and 5B, discussed later herein. Cleats 42 are sized to pass downward and through slot 33, as they pass in communication with channel 28, to sweep channel 28 and assure the continued movement of the container lids 11 therethrough. The size of cleats 42 may naturally vary within the scope of the present invention, depending upon the depth of channel 28, as it is desirable for cleats 42 to be of a size sufficient to engage the frontmost lid 11 of a vertically rotating stack, without disturbing the next adjacent lids, and also to follow that frontmost lid through channel 28 without disengaging or damaging the lid, or making unwanted frictional contact with the adjacent surface of outer wall 30. The exact dimensions of slot 33, cleats 42 and chute 23, in general, may thus be varied within this present invention keeping the above factors in mind.

Lid advancing means 34 includes a guide means 44 for platform 36, to assist in defining the line of downward travel of platform 36 in the area of chute 23, as discussed above. Guide means 44 is mounted on cross member 22 as shown in FIG. 1, and comprises an essentially L-shaped arm 46. Cam 46 defines a track 48 along its leading edge that makes slidable contact with the underside of platform 36, and is located in approximately parallel relation to inner wall 32. Track 48 is sufficiently spaced apart from inner wall 32 to permit platform 36 to move freely past chute 23, yet close enough to facilitate the communication of cleats 42 with channel 28, described earlier.

The exact number and construction of guide means 44 will vary with the specific platform 36 utilized. Thus, a single cam 46 might be utilized with a broad track disposed centrally against platform 36, to provide support directly centrally behind cleats 42. Alternately, paired parallel cams 46 may be provided to make contact with the corresponding periphery of the underside of platform 36, in which instance parallel tracks 48 would engage corresponding portions of the underside of platform 36.

Figure 6:
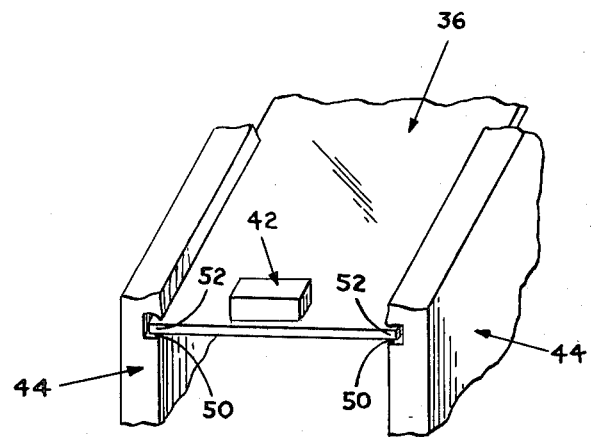
FIG. 6 is a fragmentary schematic perspective view illustrating a platform and guide means in accordance with one embodiment of the present invention.

The specific nature of the engagement between track 48 and the adjacent surface of platform 36 may likewise vary with the construction of the platform. For example, in the instance where platform 36 is a belt, track 48 may comprise a protruding rim that is adapted to mate either rollably or slidably, with a corresponding female rail disposed along the underside of platform 36. Similarly, this male-female relationship may be reversed, with track 48 defining a recess into which a rib may protrude from the underside of platform 36. In a particular embodiment, illustrated schematically in FIG. 6, paired cams 46 may define along their inner surfaces corresponding female tracks or rails 50 to receive the lateral edges 52 of essentially planar platform 36. The illustration of FIG. 6 shows a cleat 42 positioned on the upper surface of platform 36 and serves to illustrate the advantage of this construction. The provision of full edge reception of platform 36 by parallel opposed rails 50 provides additional support to flexible platform 36 that discourages possible vertical oscillation of cleat 42 during impact with the edge of a container lid. Naturally, other means of reenforcement to platform 36 to assure that only translational movement of cleat 42 occurs, are possible, and the present illustration is but one approach thereto. The provision of this reenforcement, however, comprises an advantage of the present assembly, as reduced oscillation of cleat 42 assures a minimization of lid misfeed and machine jamming in operation. Cleat 42 thus moves cleanly and translationally only, in the downward direction to engage the edge of a container lid and to smoothly urge it through the arcuately-directed channel 28 of chute 23.

While the foregoing embodiment has been illustrated with reference to the structure schematically presented in FIG. 6, it is to be understood that the platform 36 may assume alternate construction, such as parallel driving chains, in which case the rails 50 would comprise parallel extended strips adapted to rollably receive the circular bearing elements of the chain. The chain would be retained upon such rails by appropriate parallel strips, not specifically illustrated, which however would resemble in their position, the outermost portion of rails 50 of FIG. 6, so that the upper and lower surfaces of the chains comprising platform 36 would be simultaneously retained. This construction, like that illustrated in FIG. 6, would virtually eliminate rotational movement or "buckling" of platform 36 during its translational movement, so that cleats 42 could proceed firmly in contact with the edges of the container lids 11.

Figure 7:
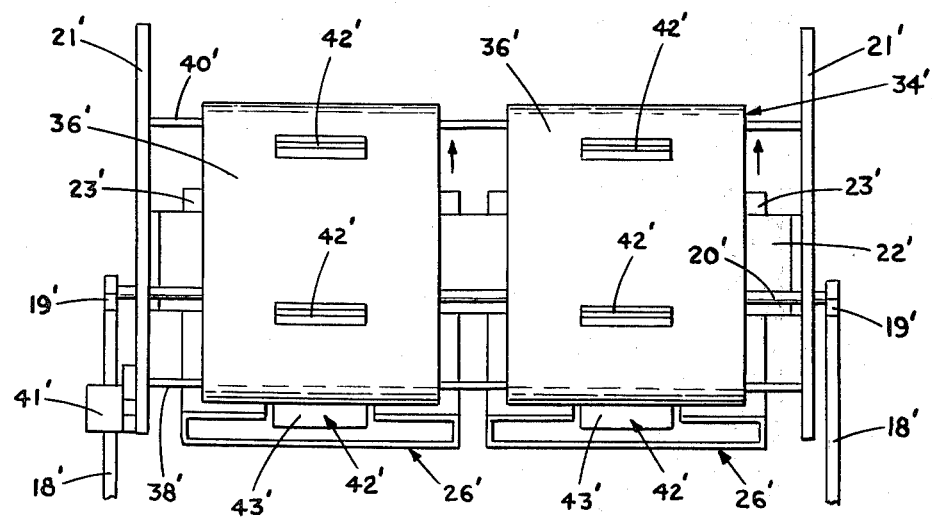
FIG. 7 is a front view similar to FIG. 3 illustrating an alternate embodiment of the present invention.

The separator assembly of the present invention may be produced for the simultaneous translational movement of a series of stacks of container lids, by the provision of multiple chutes and corresponding lid advancing means. One possible embodiment of such multiple assembly, is shown in FIG. 7, wherein vertical walls 21' support an expanded assembly including paired chutes 23' disposed in side-by-side relation. Similarly, paired platforms 36' are mounted along a common drive pulley 38' and idler pulley 40'. Also, cleats 42' are provided in similar fashion to the single embodiment discussed above, so that simultaneous translational separation of two stacks of container lids may take place. Naturally, this embodiment may be carried forth in other ways, such as by the provision of independent drive means for each assembly, and therefore the illustration of FIG. 7 is exemplary only.

Figure 4:
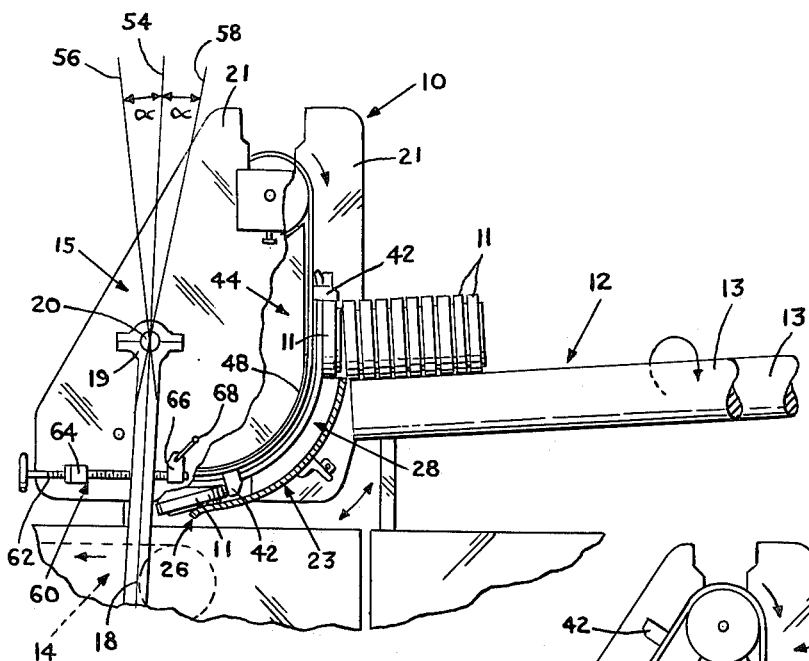
FIG. 4 is a side view partly broken away further illustrating the assembly of the present invention.

A further feature of the present invention is illustrated in FIG. 4 and comprises, as discussed earlier, the pivoting capability of assembly 10. In particular, it has been found that the ability of the assembly, and correspondingly of the chute 23 and lid advancing means 34 to tilt by some angle with respect to the vertical, assists in the separation of container lids 11 having specific structural characteristics. For example, as mentioned earlier, those lids 11 known in the art as "self-locking", are particularly troublesome to separate, and the present assembly 10 may be tilted forward, in the direction of separation, to accommodate the individual construction of the lids, and to achieve separation without difficulty. As discussed earlier, housing 15 is able to tilt along pivot axis 17, as pivot rod 20 is rotatably supported within cradles 19 provided at the upward termini of arms 18. In particular, pivot axis 17 is located in the horizontal plane as shown in FIGS. 3 and 4, in a position with respect to channel 28 defined as the radial center thereof. Accordingly, channel 28 remains in the same arc of rotation at all positions through the pivoting arc of assembly housing 15. This specific positioning of the pivot axis 17 with respect to channel 28 has been found to maintain the uniformity of movement of container lids passing through channel 28 regardless of the angle of pivot or attitude that the housing 15 assumes in relation to the vertical.

Referring further to FIG. 4, the vertical center, illustrated by line 54 may be used as reference so that it can be seen that pivoting may take place in either direction at an acute angle designated herein by the symbol $\alpha$ so that a forward pivot may place the plane containing platform 36 and chute 23 in alignment with line 56, while the rearward movement of assembly 15 would place it, for example, in the plane containing line 58. The specific value of the angle $\alpha$ and of the positions denoted by lines 56 and 58, respectively, are illustrative only, as the pivoting capability of the present assembly permits a variation in exact angulation and position, to accommodate variations in container lid shape, size and overall design.

As mentioned earlier, the pivoting adjustment of housing 15 may be performed incrementally, with means for maintaining the housing in the canted attitude selected. In particular, adjustment and locking means 60 is shown in FIG. 4, which comprises an adjustment screw 62 which may be freely rotatable within bearing 64 mounted on an outer surface of a wall 21 adjacent an arm 18 as shown. Screw 62 extends into threaded engagement with screw block 66, so that adjustment of the pivot angle $\alpha$ may be made by simply turning screw 62. Locking engagement of the adjustment means in a particular canted position may be achieved by a conventional screw lock illustrated schematically at 68, that may be turned until it makes surface contact with screw 62, to prevent the rotation thereof. The foregoing adjustment and locking means is illustrative of a variety of such mechanisms known in the art that would serve in the capacity to permit incremental adjustment and fixation of housing 15 in a particular attitude.

OPERATION

Referring to FIGS. 5A and 5B, the operation of the present separator assembly is commenced by the activation of the drive motor to cause the corresponding commencement of translational movement of platform 36. As shown in FIG. 5A, platform 36 moves into a position whereby leading surface 43 of cleat 42 makes edge contact with a container lid 11, urging the lid into the infeed end 24 of chute 23. It should be mentioned that the manner in which the container lids 11 are brought into contact with chute 23, is such that the lids are thrust into surface contact against the upwardly extending adjacent surface of inner wall 32. Thus, the lids 11 need only to be urged downward by cleat 42 to start their traverse or arcuately-directed channel 28.

Referring now to FIG. 5B, as platform 36 rotates and with it, cleat 42, container lid 11 is continually urged through chute 23 so that, as illustrated in this FIGURE, container lid 11 is about to be ejected through discharge end 26. The downwardly flared lip of discharge end 26 assures an unobstructed ejection of container lid 11, to the appropriate position along a conveyor such as conveyor 14.

As discussed earlier, modifications in the angle of the vertical plane containing chute 23 and lid advancing means 34, may be made within the scope of the present invention, to accommodate variations in container size and construction. Otherwise, the operation of the present assembly in such alternate attitudes proceeds the same.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope and defined by the claims.

What is claimed is:

1. A separator assembly for the continuous translational movement of container lids, comprising:
    (A) an assembly housing pivotally mounted on a base, said housing comprising parallel vertical walls with their planes in line with the direction of travel of said container lids, and a connecting cross member extending transversely therebetween;

(B) a downwardly extending rigid chute for the reception and passage therethrough of said container lids, said chute mounted between said walls and having a generally vertical infeed end, a generally horizontal discharge end, and a plane rotating, arcuately directed channel disposed therebetween;

(C) said chute having stationary walls comprising at least one broad, partially curvilinear outer wall, and at least one broad, partially curvilinear inner wall parallel and spaced part therefrom, said outer wall and said inner wall cooperating to define, at their respective ends, said infeed end and said discharge end, and defining between their broad surfaces, said arcuately-directed channel; and (D) movable lid advancing means supported by said walls and said cross member, having a portion thereof extending into said chute and traveling through the entire length of said chute, cooperating with said chute to urge said container lids downwardly therethrough;

wherein the vertical attitude of said chute and said lid advancing means is incrementally adjustable to accommodate variations in container lid design.

2. The separator of claim 1 wherein said lid advancing means comprises:

(A) an endless, flexible platform rotatable about horizontal axes, with a portion of its line of travel adapted for downward movement inboard of said chute and adjacent said inner wall; and (B) a plurality of regularly spaced cleats extending outwardly from said platform, said cleats adapted to make contact with consecutive container lids adjacent said infeed end, to urge said lids into said chute, said cleats further adapted to communicate with said arcuately-directed channel to follow said container lid passing therethrough, to urge said container lid through said chute and out through said discharge end.

3. The separator assembly of claim 2 wherein said platform comprises a continuous belt.

4. The separator assembly of claim 2 wherein said lid advancing means further comprises guide means for said platform mounted on said cross member to define the line of travel of said platform adjacent said chute, said guide means defining at least one track for said platform, disposed in parallel relation to said inner wall, sufficiently spaced apart from said inner wall to permit said platform to move freely therepast, to support said platform through its line of travel adjacent said chute.

5. The separator of claim 4 wherein said guide means defines at least one track having a shape corresponding to that of said chute and located adjacent thereto, for the support of said platform generally parallel to said chute while it moves therepast.

6. The separator assembly of claim 5 wherein said platform comprises an essentially planar belt having parallel lateral edges, and said guide means comprises paired, parallel rails defining corresponding tracks adapted to receive the lateral edges of said platform, to minimize any oscillatory movement thereof, while said platform passes adjacent said chute.

7. The separator assembly of claim 2 wherein said platform is rotatable about paired, spaced apart horizontal axes.

8. The separator assembly of claim 7 wherein said horizontal axes comprise a lower drive axis, located adjacent the discharge end of said chute, an upper idler axis, located adjacent and upward of the infeed end of said chute, and drive means mounted outside said assembly housing in operative connection with said drive axis to impart rotational movement thereto, to in turn cause the translational movement of said platform.

9. The separator assembly of claim 8 wherein said drive axis and said idler axis define corresponding pulleys for making rolling contact with the respective adjacent surfaces of said platform.

10. The separator assembly of claim 1 wherein said assembly housing is pivotable about a horizontal axis journaled through said walls at a point comprising the radial center of said arcuately-directed channel.

11. The separator assembly of claim 10 wherein said base defines paired vertical support arms terminating at their upward extent in parallel cradles adapted to pivotally receive said pivot axis, and to provide pivotal support for said assembly housing.

12. The separator assembly of claim 11 further including incremental adjustment means extending between at least one of said support arms, and the adjacent surface of an outer wall of said assembly, to permit the adjustment and fixation of the pivot angle of said assembly, with respect to said base.

* * * * *